US010932086B2

(12) United States Patent
Thakur et al.

(10) Patent No.: US 10,932,086 B2
(45) Date of Patent: Feb. 23, 2021

(54) VEHICLE SENSING AND ACCESS CONTROL FOR ON-DEMAND SERVICES

(71) Applicant: Nissan North America, Inc., Franklin, TN (US)

(72) Inventors: Siddharth Thakur, Fremont, CA (US); Gregory D. Dibb, Mountain View, CA (US); GianLuca Storti, San Jose, CA (US); Masahide Nakamura, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 97 days.

(21) Appl. No.: 16/263,739

(22) Filed: Jan. 31, 2019

(65) Prior Publication Data

US 2019/0166460 A1 May 30, 2019

Related U.S. Application Data

(63) Continuation of application No. 15/636,010, filed on Jun. 28, 2017, now Pat. No. 10,237,690.

(51) Int. Cl.
*H04W 4/02* (2018.01)
*H04L 12/40* (2006.01)
*H04Q 9/00* (2006.01)

(52) U.S. Cl.
CPC ............ *H04W 4/023* (2013.01); *H04L 12/40* (2013.01); *H04Q 9/00* (2013.01); *H04L 2012/40215* (2013.01)

(58) Field of Classification Search
CPC ....... H04W 4/023; H04W 4/029; H04W 4/02; H04L 12/40; H04L 2012/40215; H04Q 9/00; G06Q 50/06
See application file for complete search history.

(56) References Cited

U.S. PATENT DOCUMENTS

| | | | |
|---|---|---|---|
| 6,339,736 B1 * | 1/2002 | Moskowitz | G06Q 10/087 701/32.7 |
| 9,508,204 B2 | 11/2016 | Oz et al. | |
| 9,821,768 B2 | 11/2017 | Oz et al. | |
| 2005/0130671 A1 | 6/2005 | Frank et al. | |
| 2008/0223926 A1 * | 9/2008 | Miller | G07C 9/37 235/382 |
| 2009/0005902 A1 * | 1/2009 | Megiddo | G06Q 10/08 700/236 |
| 2011/0130916 A1 | 6/2011 | Mayer | |
| 2013/0079033 A1 * | 3/2013 | Gupta | G01S 5/0252 455/456.2 |
| 2013/0282500 A1 * | 10/2013 | Latorre | G07F 13/02 705/17 |

(Continued)

*Primary Examiner* — Nathan A Mitchell
(74) *Attorney, Agent, or Firm* — Young Basile Hanlon & MacFarlane, P.C.

(57) ABSTRACT

Methods, apparatuses, systems, and non-transitory computer readable storage media for providing on-demand services to vehicles are described. The disclosed technology determines information associated with a vehicle, generates a request for a fuel delivery on-demand service using the information, confirms identification of the vehicle using a wireless signal of the vehicle, provides access to the vehicle to enable performance of the fuel delivery on-demand service and secures the vehicle after completion of the fuel delivery on-demand service.

18 Claims, 9 Drawing Sheets

(56) References Cited

U.S. PATENT DOCUMENTS

| | | | |
|---|---|---|---|
| 2014/0077936 A1* | 3/2014 | Brown | B60R 16/0232 340/10.5 |
| 2014/0129379 A1* | 5/2014 | Tryba | G06Q 30/0639 705/26.8 |
| 2015/0352947 A1* | 12/2015 | Hubschman | B60K 15/0406 340/450.2 |
| 2016/0096508 A1* | 4/2016 | Oz | H04W 4/029 701/36 |
| 2016/0098670 A1 | 4/2016 | Oz et al. | |
| 2016/0098876 A1 | 4/2016 | Oz et al. | |
| 2016/0117636 A1* | 4/2016 | Miller | G06Q 50/30 705/332 |
| 2016/0189098 A1 | 6/2016 | Beaurepaire et al. | |
| 2016/0292635 A1* | 10/2016 | Todasco | H04W 4/023 |
| 2016/0311410 A1* | 10/2016 | Donzis | B60K 15/05 |
| 2016/0321740 A1* | 11/2016 | Hill | G01C 21/3407 |
| 2017/0039661 A1 | 2/2017 | Vanslette et al. | |
| 2017/0073211 A1* | 3/2017 | Wilson | B67D 7/348 |
| 2017/0074000 A1 | 3/2017 | Banvait | |
| 2017/0140455 A1* | 5/2017 | Tryba | G06Q 30/0639 |
| 2017/0221116 A1* | 8/2017 | Makke | B67D 7/04 |
| 2018/0040172 A1 | 2/2018 | Funk | |
| 2018/0057347 A1* | 3/2018 | Oesterling | G07C 5/008 |
| 2018/0072152 A1* | 3/2018 | Dudar | B67D 7/145 |
| 2018/0072556 A1* | 3/2018 | Dudar | B67D 7/145 |
| 2018/0300823 A1* | 10/2018 | Aubuchon | G06Q 50/06 |
| 2018/0339682 A1* | 11/2018 | Hall | G07F 13/025 |

\* cited by examiner

VEHICLE SENSING AND ACCESS CONTROL FOR ON-DEMAND SERVICES

CROSS-REFERENCE TO RELATED APPLICATION(S)

This application is a continuation of U.S. patent application Ser. No. 15/636,010, filed on Jun. 28, 2017, the entire content of which is incorporated herein by reference.

TECHNICAL FIELD

This application relates to vehicle sensing, discovery, and access control, including methods, apparatuses, systems, and non-transitory computer readable media for providing on-demand services.

BACKGROUND

Increasing connectivity and integration of hardware functions on vehicles that include cloud services have made several features possible such as web browsing, remote locking/unlocking and location detection. In addition, the operation model of conventional services such as re-fueling, vehicle cleaning and maintenance, and package delivery is changing.

SUMMARY

Disclosed herein are aspects, features, elements, implementations, and implementations for providing on-demand services to vehicles.

An aspect of the disclosed implementations includes a method for providing an on-demand service to a vehicle. The method comprises determining information associated with the vehicle, wherein the information includes a location of the vehicle. The method includes generating a request for the on-demand service using the information and confirming identification of the vehicle using a wireless signal of the vehicle. The method includes providing access to the vehicle to enable performance of the on-demand service and securing the vehicle after completion of the on-demand service.

An aspect of the disclosed implementations includes a system for providing an on-demand service to a vehicle. The system comprises a processor and a memory including instructions executed by the processor to: determine information associated with the vehicle, wherein the information includes a location of the vehicle; generate a request for the on-demand service using the information; confirm identification of the vehicle using a wireless signal of the vehicle; provide access to the vehicle to enable performance of the on-demand service; and secure the vehicle after completion of the on-demand service.

An aspect of the disclosed implementations includes a method that determines information associated with a vehicle, generates a request for a fuel delivery on-demand service using the information, confirms identification of the vehicle using a wireless signal of the vehicle, provides access to the vehicle to enable performance of the fuel delivery on-demand service and secures the vehicle after completion of the fuel delivery on-demand service.

An aspect of the disclosed implementations includes a system comprising a processor and a memory including instructions executed by the processor to: determine information associated with a vehicle, generate a request for a fuel delivery on-demand service using the information, confirm identification of the vehicle using a wireless signal of the vehicle, provide access to the vehicle to enable performance of the fuel delivery on-demand service and secure the vehicle after completion of the fuel delivery on-demand service.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
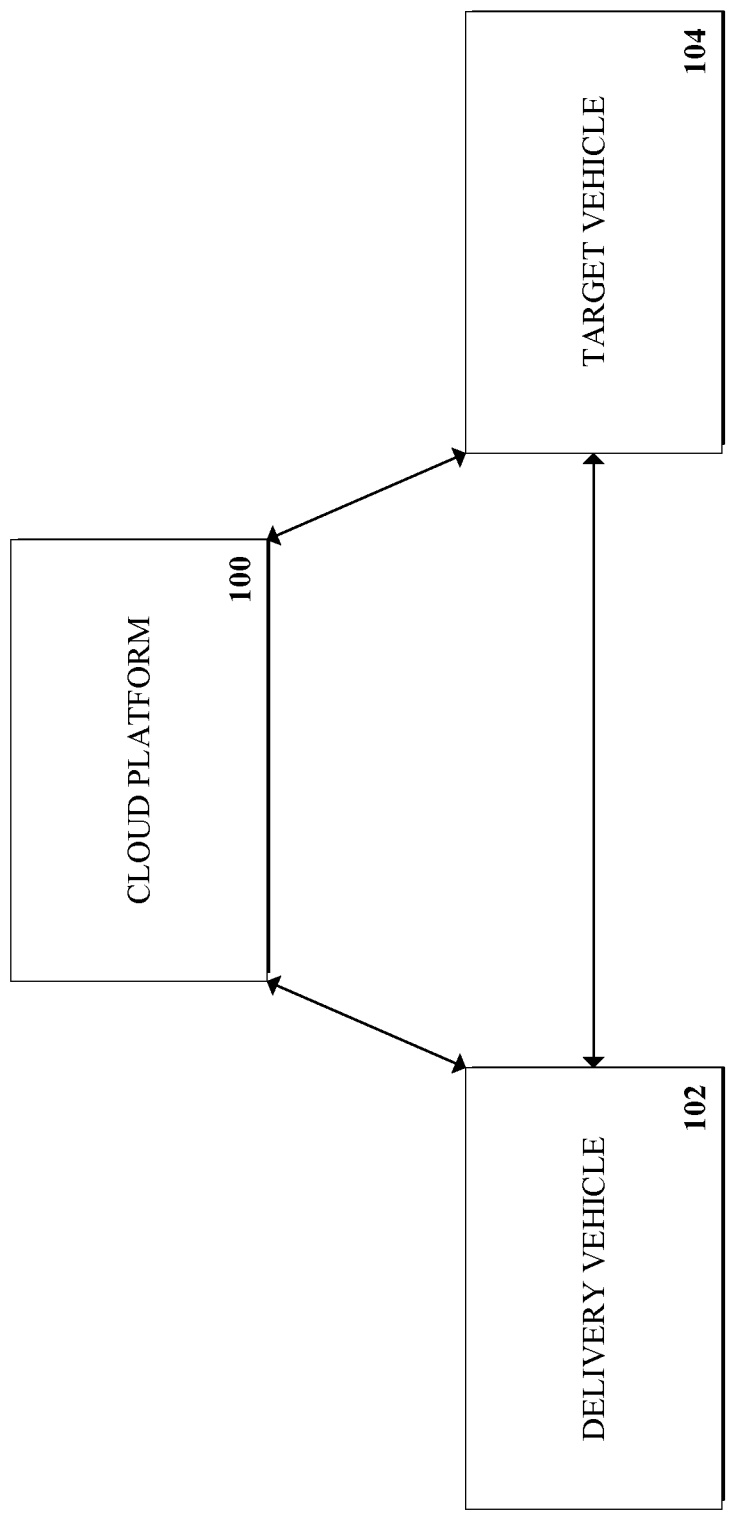
FIG. 1 illustrates a block diagram of an example of a system for providing on-demand services in accordance with implementations of this disclosure.

Vehicles are equipped with additional technology (both hardware and software) to provide features that enhance the overall user (or driver) experience. Increased connectivity and the integration of hardware functions on the vehicle with cloud services provide some of these features. For example, vehicles can include connectivity hardware such as Bluetooth technology (e.g., to enable the driver to connect their smartphone to the car and play their favorite music), WiFi technology (e.g., to enable the driver to browse the internet to find a restaurant nearby), and dedicated short-range communications (DRSC) technology (e.g., to enable the vehicle to communicate with other vehicles or computing devices nearby). As another example, vehicles can include cloud controlled functionality that enables the remote locking/unlocking of the vehicle (e.g., the driver can unlock the vehicle via a smartphone application before getting to the vehicle), the identification of the vehicle's location (e.g., to find exactly where you parked), the monitoring of various vehicle statuses via various sensors (e.g., fuel level is low).

In addition, on-demand services (e.g., Uber's service that allows you to hail a cab-like vehicle via a smartphone application) have changed the operation model of services associated with vehicles including but not limited to refueling, car washes, car maintenance, and package delivery. For example, as opposed to driving to a gas station, a user/driver can request to have the vehicle refueled by a service provider that comes to the car while the user/driver is still at work. Additional examples include but are not limited to getting your vehicle washed in the parking lot at work instead of driving to a car washing service, getting your vehicle's oil changed or wiper replaced instead of going to a mechanic shop, and getting packages delivered to the trunk of your vehicle while you at work instead of having the packages left on your front doorstep.

Conventional methodologies suffer from a variety of issues including the automated sensing of the need for a service (e.g., being able to detect that the fuel level is low and transmitting that information to the service provider), the rendezvousing with the vehicle in terms of accurate locating and identification of the vehicle (e.g., locating a vehicle in a parking garage), and the need to involve the vehicle's owner (i.e., the user or driver) to provide the vehicle's keys or access to the vehicle (e.g., leaving the gas tank open to enable the refueling on-demand service). A location of a vehicle that is provided via a smartphone application or directly by a user of the vehicle may not be accurate which adds times and cost to providing the on-demand service. In addition, requiring the user to be present to provide vehicle access or to unlock the vehicle and leave it unlocked in advance reduces the convenience value of the on-demand service.

A method and system in accordance with the present disclosure provides a disclosed technology that enables on-demand services associated with enhancing vehicle experiences (i.e., on-demand services designed around the vehicle) to be provided seamlessly to the user thereby enhancing convenience. The method and system provides vehicle to vehicle (or smartphone or another computing device to vehicle) sensing, discovery, and access control to seamlessly and efficiently provide on-demand vehicle convenience services (i.e., on-demand services). The on-demand services can include but are not limited to refueling the vehicle, cleaning or washing the vehicle, providing maintenance (e.g., oil changes) to the vehicle, and delivering packages within the vehicle.

The method and system can sense the need for the on-demand service based on data received from vehicle sensors (including but not limited to fuel level, odometer, check engine lights, service reminder alerts, etc.), can determine an accurate location of the vehicle when requesting the on-demand service and planning the dispatch, can provide wireless sensing and vehicle to vehicle or vehicle to smartphone communications once a service provider vehicle is within a certain range of the vehicle being serviced to provide navigation within crowded vehicle areas such as parking lots, can confirm the vehicle's identification by activating the vehicle being serviced (e.g., exchanging unique tokens, flashing lights, sounding alarms or horns, etc.), can provide access to the vehicle for the service provider without requesting the key or other actions from the vehicle owner, and can secure the vehicle after automatically detecting that the on-demand service has been completed or receiving notification/communication of its completion from the service provider. Built-in redundancies are also provided (e.g., locking or securing the vehicle after no motion activity is detected around the vehicle for a predetermined time period) to ensure vehicle safety.

The method and system for providing on-demand services to vehicles can include sensing of information associated with the vehicle (i.e., target vehicle). The vehicles can be integrated with cloud services that report various sensor readings and data (i.e., information detected by the sensors associated with the vehicle) to the cloud including but not limited to the vehicle location and fuel level. The data can be stored securely and accessed by an authorized on-demand service provider via a web API. Based on the detected data, various on-demand services can be recommended to the vehicle's user for authorization or a request for performing the recommended on-demand service can be automatically generated and transmitted to a service provider (from a list of authorized service providers) that can perform the recommended on-demand service with no need for user intervention. The service provider can receive the request that includes precise vehicle location details and information to ensure efficient performance of the on-demand service. In addition to recommendations, urgent or required on-demand services can be determined using the detected data.

The vehicle sensing that leads to the detection of service needs can be performed on-board the vehicle using high frequency real time data. On-board computation models can be updated remotely. For example, tire threads can be estimated by combining high frequency GPS data and vehicle speed data. The detection of the service needs can also be performed in the cloud using low frequency vehicle telemetry data that is transmitted to the cloud. For example, a distance to empty value can be utilized to identify refueling service requirements on longer trips.

The method and system for providing on-demand services to vehicles can include dispatching service providers for performance of the on-demand services. The service providers can receive real-time vehicle location information to plan performance of the requested service. For example, the service providers can optimize routes and the order of performance using real-time vehicle information associated with a plurality of vehicles. Notifications can be sent to the vehicle's user (either by the method and system directly or via the service provider) via smartphone applications or in-vehicle infotainment systems about the service scheduling and fulfillment (post-completion). If the vehicle is required to be in a designated area (e.g., in a service supported parking lot), a notification can be sent to the user with the location information of the designated area and the service time provided by the service provider. The service provider and the user can communicate to reschedule if needed or propose a different time and location.

The method and system for providing on-demand services to vehicles can include rendezvous information that enables the service provider to confirm identification of the vehicle being serviced (i.e., the target vehicle). The information enables the service provider (and associated delivery vehicle or delivery agent) to navigate to the vehicle's location. Once the delivery vehicle is within a certain predetermined range (e.g., a wireless signal range) of the target vehicle, the delivery vehicle can be provided with proximity information to the target vehicle based on a signal strength of a wireless signal (e.g., Bluetooth, WiFi, DSRC, NFC, etc.) using wireless sensing equipment associated with the delivery and target vehicles. If the signal strength is above a predetermined threshold, the delivery vehicle and the target vehicle may exchange unique tokens or other encrypted communications to confirm each other's identity. Other mechanisms can be utilized to confirm the identification of the vehicle including but not limited to flashing lights, turn signals, and sounding horns. If the delivery vehicle does not support wireless interaction and communications with other vehicles, the service provider can use a smartphone's wireless capabilities to interact and communicate with the target vehicle. The cloud-based application of the method and system facilitates the interactions and communications between the delivery vehicle and the target vehicle.

The method and system for providing on-demand services to vehicles can include access control functionality. Once the delivery vehicle is within a predetermined distance of the target vehicle and the identification of the target vehicle has been confirmed, the delivery vehicle can request for access to a specific location of the vehicle (e.g., car interior, fuel door, trunk, glove compartment, etc.) or the delivery vehicle can be provided with automatic access. After receiving access to the vehicle and performing the requested or scheduled on-demand service, the vehicle can be automatically secured or secured by the service provider (e.g., the service provider can press a 'lock' button on the smartphone application that is in communication with the target vehicle). The wireless link between the delivery vehicle (or service provider's smartphone) and the target vehicle can serve as a redundancy to ensure proper service completion. If the wireless link is interrupted, the target vehicle can be automatically secured or locked. If the target vehicle cannot be secured for whatever reason (e.g., malfunction of the target vehicle's locking mechanism), a notification requesting assistance can be sent to the user of the target vehicle, to the service provider, a third-party, or any combination thereof.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and vehicles, for example, those concerning the extension of computer network components and cloud computing services to streamline the performance of on-demand services between service providers and target vehicles. The development of new ways to provide on-demand services to vehicles by providing a communication platform between delivery vehicles and target vehicles and eliminating the need for user intervention is fundamentally related to vehicle related computer networks and technology.

To describe some implementations in greater detail, reference is made to the following figures.

FIG. 1 illustrates a block diagram of an example of a system 100 for providing on-demand services in accordance with implementations of this disclosure. The system 100 can comprise a cloud platform that includes an application for storing, displaying, and processing information and communication links for communicating with both a delivery vehicle 102 and a target vehicle 104. The application of the cloud platform can include a web interface and a plurality of cloud services. The application of the cloud platform can be a vehicle OEM cloud application. The system 100 can receive and process data and information associated with the target vehicle 104 to determine on-demand service needs of the target vehicle 104. The determination of on-demand service needs can be based on any of user preferences, vehicle history, and machine learning techniques utilizing a database of information associated with other vehicles. The target vehicle 104 can include a plurality of sensors that detect the data and information or the target vehicle 104 can include an onboard system including but not limited to a telematic control unit (TCU) that detects the data and information. For example, the data and information can comprise a low fuel level indication that leads to the determination that the target vehicle 104 could use a refueling on-demand service (i.e., the determined on-demand service need of the target vehicle 104).

The system 100 can transmit the determined on-demand service needs of the target vehicle 104 and additional information to the delivery vehicle 102 or to a cloud-based computing device associated with the delivery vehicle 102 (e.g., to a smartphone and application used by a service provider/delivery agent/driver that is operating the delivery vehicle 102 or to a service provider cloud application that manages a plurality of service providers and associated delivery vehicles). The additional information that is sent to the delivery vehicle 102 can include but is not limited to location information associated with the target vehicle 104. Once receiving the determined on-demand service needs and additional information, the service provider associated with the delivery vehicle 102 can perform the on-demand service on the target vehicle 104 at the scheduled time and location.

Figure 2:
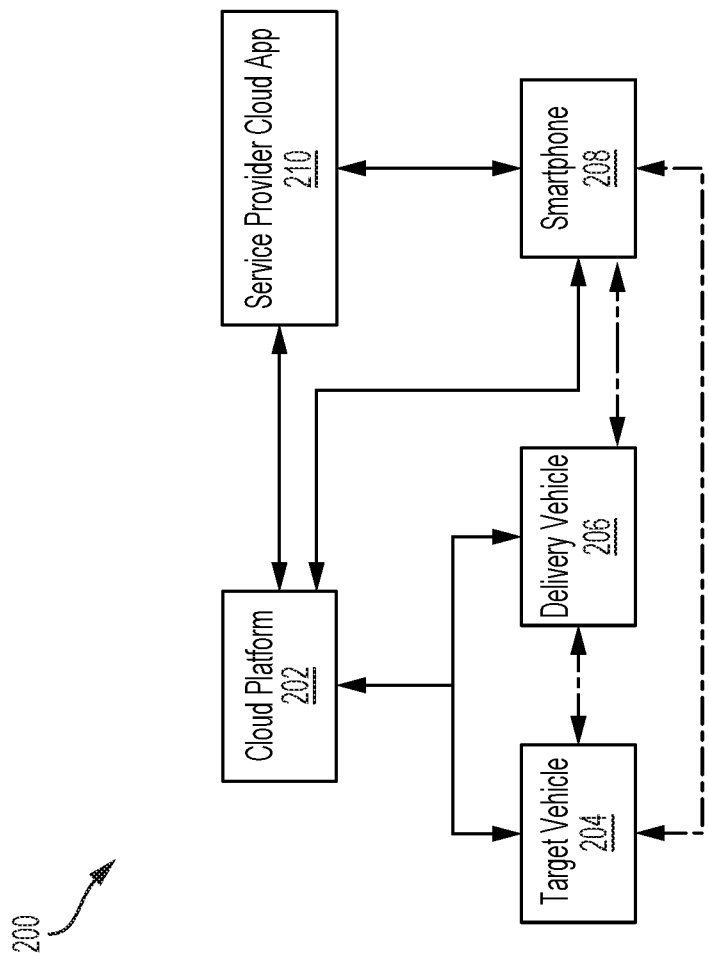
FIG. 2 illustrates a block diagram of an example of an environment for providing on-demand services in accordance with implementations of this disclosure.

FIG. 2 illustrates a block diagram of an example of an environment 200 for providing on-demand services in accordance with implementations of this disclosure. The environment 200 includes a cloud platform 202, a target vehicle 204, a delivery vehicle 206, a smartphone 208, and a service provider cloud app 210. The smartphone 208 can comprise the cloud-based computing device (e.g., smartphone, tablet, laptop, etc.) that is associated with the delivery vehicle 206 (similar to the cloud-based computing device comprising a smartphone with an embedded application that is associated with the delivery vehicle 102 in FIG. 1). The smartphone 208 can be part of the delivery vehicle 206 or can be an external device (e.g., a smartphone operated by a service provider/delivery agent/driver of the delivery vehicle 206). The service provider cloud app 210 can be a cloud-based platform that communicates and manages a plurality of delivery vehicles (and associated cloud-based computing devices). The service provider can access the service provider cloud app 210 when planning and completing the on-demand services associated with the target vehicle 204.

The cloud platform 202 can include a web interface and a plurality of cloud services. The web interface can include both a fleet dashboard (e.g., displaying a plurality of delivery vehicles providing service or a plurality of target vehicles in need of service) and a user dashboard (e.g., a dashboard that can be controlled by an administrator or target vehicle owners/users). The cloud services can include but are not limited to Resin.io, deploy pipeline, device dashboards, app services (e.g., Azure), SQL databases, network security, cloud applications (e.g., an Anchor cloud app with REST HTTPS or MQTT over TLS encryption capability), and a machine-to-machine (M2M) or Internet of Things (IoT) connectivity protocol broker (e.g., a MQTT broker). The MQTT broker can be an open source Mosquitto MQTT broker that provides encrypted communication (e.g., MQTT over TLS) and certificate based client authentication.

The target vehicle 204 can include an on-board unit (e.g., a built-in or installed telematic control unit) that includes but is not limited to an on-board diagnostics port (e.g., OBD2 port, similar ports), hardware comprising an USB LTE, GPS sensors, CAN transceivers, Bluetooth, WiFi, a system-on-a-chip (e.g., a Linux SoC), and software comprising device applications (e.g., Anchor device app, Docker, ResinOS, Yocto, Linux). The cloud platform 202 can receive over the air updates, can support multiple vehicle types (makes/models), and can be structured modularly to enable easy updating of various features.

The cloud platform 202 can include a plurality of components including but not limited to a third-party service API, application logic, and vehicle interaction API. The target vehicle 204 can include a plurality of components including but not limited to cellular hardware/software, on-board software, wireless hardware/software (e.g., Bluetooth, WiFi, DSRC, etc.), and a controller access network (CAN) bus providing CAN bus connectivity and supporting the sensor data detection. The delivery vehicle 206 can include a plurality of similar components as the target vehicle 204 (e.g., cellular hardware/software, on-board software, wireless hardware/software including but not limited to Bluetooth, WiFi, DSRC, and a CAN bus). In both the target vehicle 204 and the delivery vehicle 206, the cellular hardware/software can communicate with the on-board software and the on-board software can communicate with both the wireless hardware/software and the CAN bus. The smartphone 208 can include a plurality of components including but not limited to cellular hardware/software, a smartphone application (app), and wireless hardware/software including but not limited to Bluetooth and WiFi. The components of each of the cloud platform 202, the target vehicle 204, the delivery vehicle 206, and the smartphone 208 can be used in various combinations to facilitate the communications between each other.

The cloud platform 202 can utilize CAN sensor data (i.e., sensor data) to determine what services (including on-demand services) target vehicles should be recommended (e.g., car washing, changing wiper blade, etc.) or what services (including on-demand services) might be required (e.g., low fuel level, tire pressure flat, etc.). The determinations can include suggested service times (e.g., change oil within the next week). The on-board control unit (e.g., TCU) of the target vehicle 204 can process the sensor data for service identification or the cloud platform 202 can receive and process the sensor data for service identification. The cloud platform 202 can streamline the location process of the target vehicle 204 for the service provider even in difficult places (e.g., parking lots). The cloud platform 202 can confirm that the target vehicle 204 has been secured after the service has been completed by notifying the owner/user of the target vehicle 204 (e.g., sending an alert via an app or sending an email).

The cloud platform 202 can perform a plurality of functions including but not limited to receiving/sending MQTT messages from/to a plurality of devices (e.g., the target vehicle 204, the delivery vehicle 206, a target vehicle's TCU, the smartphone 208), storing sensor data received from the plurality of devices, exposing hyper media compliant HTTPS REST API end points to interact (e.g., filtering, paging, sorting) with data, publishing data received from the plurality of devices on other queues for partners with higher data demands, exposing HTTPS API end points to receive service requests from partners (e.g., service providers operating delivery vehicles), auto-configuring and provisioning new devices, managing service configurations for the plurality of devices, exposing HTTPS REST API end points to modify device service configurations from partners, and servicing and displaying fleet dashboards and user dashboards. The fleet dashboards can comprise a web application (e.g., React.js Javascript web application). The fleet dashboards provide a plurality of functions including but not limited to visualizing device locations on a map (e.g., displaying delivery vehicles), displaying device heartbeat messages, interacting with the user dashboards (e.g., overlays so that both delivery vehicles and target vehicles are displayed on the same map). The user dashboards can also comprise a web application and provide a plurality of functions including but not limited to visualizing device locations on a map (e.g., displaying target vehicles), sending commands (e.g., lock door, unlock door, roll down windows, open trunk, close trunk, etc.) to the devices via a service provider cloud app (e.g., the service provider cloud app 210), displaying CAN signals to confirm the target vehicles are secured (i.e., analyzing door status of the target vehicles).

The cloud platform 202 can facilitate communications (e.g., sending messages, alerts, triggering actions, etc.) between the target vehicle 204 and the delivery vehicle 206 using the vehicle interaction API and can communicate with both the target vehicle 204 and the delivery vehicle 206. For example, the cloud platform 202 can receive data communications from the target vehicle 204 regarding vehicle status indications that the target vehicle 204 (or an onboard device such as a TCU) has detected (e.g., fuel level low) and the cloud platform 202 can send additional information or determinations made based on the received data communications to the delivery vehicle 206 (e.g., a refueling on-demand service need alert or a location of the target vehicle 204 so that the delivery vehicle 206 automatically navigates to the location if available). In addition, providing access to and securing the target vehicle 204 can be facilitated by an instruction sent by the cloud platform 202 or by the smartphone 208 that triggers the locking/unlocking mechanisms via the CAN bus of the target vehicle 204.

The cloud platform 202 can also communicate directly with the smartphone 208 (e.g., if the smartphone 208 being utilized is registered as an authorized user via the cloud platform 202) or indirectly with the smartphone 208 via the service provider cloud app 210. For example, the cloud platform 202 can receive availability information from the service provider via the smartphone 208 and/or the service provider cloud app 210 so that the cloud platform 202 can properly schedule an on-demand service that the target vehicle 204 requires. As another example, the cloud platform 202 can send out alerts to a plurality of service providers (and their associated smartphones) via the service provider cloud app 210 to gauge availability after an on-demand service need is determined.

The target vehicle 204 and the delivery vehicle 206 can communicate with each other when certain conditions are met (resulting in the dotted line arrows) including but not limited to exchanging a unique token that confirms vehicle identities and to being within a predetermined distance from each other. The communications can be activated using wireless sensing that gauges wireless signal strengths between the target vehicle 204 and the delivery vehicle 206. For example, after a service provider has scheduled performance of an on-demand service (e.g., refueling) and navigates the delivery vehicle 206 to be within a certain proximity of the target vehicle 204 (e.g., the same parking lot), the target vehicle 204 can wirelessly sense via signal strengths that the delivery vehicle 206 is nearby and then the target vehicle 204 can communicate with the delivery vehicle 206 by flashing its lights to confirm the correct identity of the target vehicle 204.

The target vehicle 204 and the smartphone 208 can communicate with each other when certain conditions are met (resulting in the dotted line arrows) including but not limited to being within a predetermined distance from each other. For example, the service provider can send a request for additional information via the smartphone 208 and to the target vehicle 204 when performing the on-demand services. The delivery vehicle 206 and the smartphone 208 can communicate with each other when certain conditions are met (resulting in the dotted line arrows) including but not limited to registering the smartphone 208 with the delivery vehicle 206. For example, after a service provider receives the smartphone 208, the service provider can setup a connection between the smartphone 208 and the service provider cloud app 210 and also between the smartphone 208 and the delivery vehicle 206 that the service provider operates.

Figure 3:
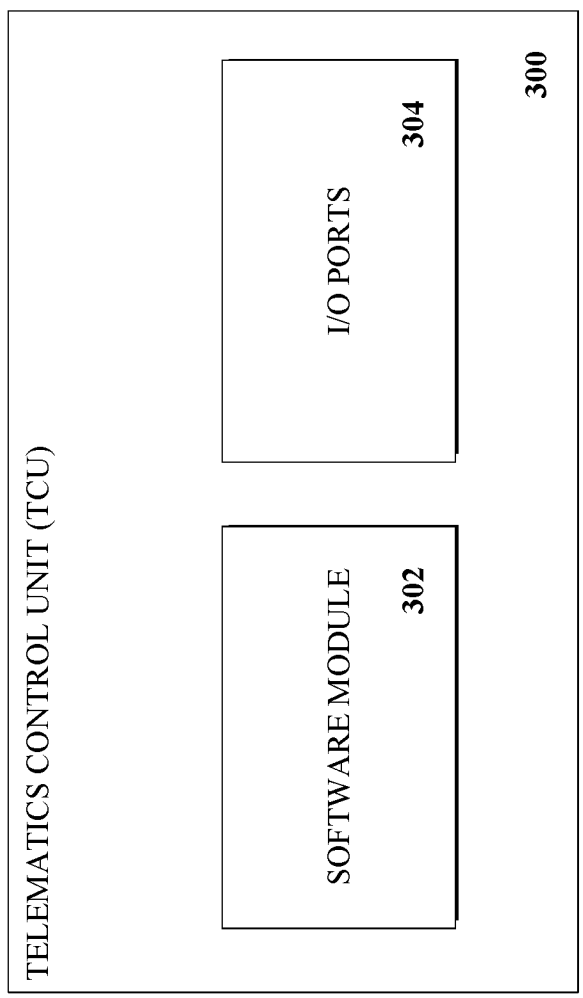
FIG. 3 illustrates an example of a telematic control unit used for providing on-demand services in accordance with implementations of this disclosure.

FIG. 3 illustrates an example of a telematic control unit 300 used for providing on-demand services in accordance with implementations of this disclosure. The telematic control unit 300 comprises a plurality of hardware components, a software module 302 comprising a plurality of software applications, and input/output (I/O) components 304. The telematic control unit 300 can connect a target vehicle (e.g., the target vehicle 104 of FIG. 1 or the target vehicle 204 of FIG. 2) to a cloud platform (e.g., the cloud platform 100 of FIG. 1 or the cloud platform 202 of FIG. 2). The telematic control unit 300 can be embedded or part of the target vehicle or can be coupled to or installed into the target vehicle. The telematic control unit 300 can be coupled to a plurality of different types of vehicles that vary in make and model.

The telematic control unit 300 can be connected to other vehicle sub-systems (e.g., other sub-systems of the target vehicles) through a CAN bus. The plurality of hardware components can comprise a system-on-a-chip (SoC) (e.g., a Linux SoC, single board computers, computer on modules), a CAN bus (i.e., a CAN transceiver), a Bluetooth transceiver (or other wireless communication transceiver), a GPS sensor, and a cellular modem (e.g., Verizon USB LTE modem). The plurality of hardware components can facilitate the communications between the target vehicle that includes the telematic control unit 300 and the cloud platform or the delivery vehicles that are used by the service providers to service the target vehicles. The software module 302 can include an application (e.g., a containerized Python app) and an operating system (e.g., ResinOS). The I/O components 304 can include a cable to OBD2 port, an external GPS antenna, and wireless components (e.g., Bluetooth, LTE).

The telematic control unit 300 can filter and receive CAN messages from the sensors connected to the CAN bus (e.g., fuel level sensor, tire pressure sensor), send CAN messages (e.g., to lock/unlock vehicle doors, open vehicle trunks), capture device location on changes in position and various time intervals, scan for Bluetooth device MAC addresses in regular and low energy modes, provide on the fly service reconfiguration (e.g., turn on/off, change service parameters), can always be on by being powered from the vehicle battery through the OBD2 port, provides low latency in message transfer, provides heartbeat messages for full visibility in fleet operations, and can disable CAN write mode when the vehicle is in drive or reverse. The telematic control unit 300 can receive automated over the air (OTA) updates using deploy pipelines (e.g., Resin.io deploy pipeline), can be visible as a device using dashboards (e.g., Resin.io dashboard), can have device configurations managed using a cloud platform, can provide encrypted communications (MQTT over TLS).

Figure 4:
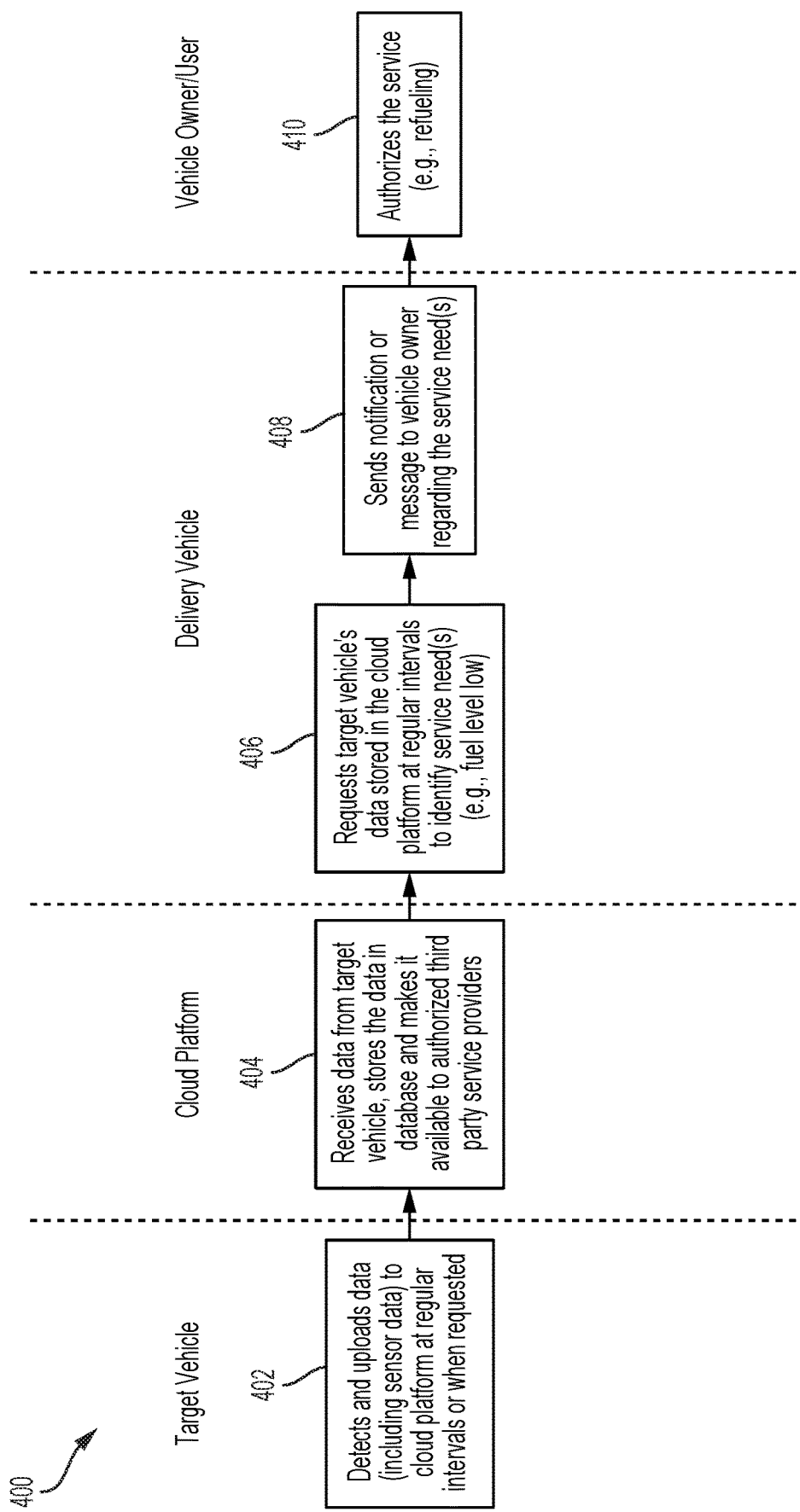
FIG. 4 illustrates a flowchart of an example of a method for sensing service needs in accordance with implementations of this disclosure.

FIG. 4 illustrates a flowchart of an example of a method 400 for sensing service needs in accordance with implementations of this disclosure. The method 400 is performed within an environment that includes a delivery vehicle (e.g., the delivery vehicle 102 of FIG. 1) that is associated with a service provider, a cloud platform (e.g., the cloud platform 100 of FIG. 1), and a target vehicle (e.g., the target vehicle 104 of FIG. 1) that is associated with a vehicle owner/user. The delivery vehicle can be controlled by the service provider (i.e., delivery agent) via a cloud-based computing device (e.g., a smartphone with an app, a built-in tablet with dashboard, etc.) that is in communication with the cloud platform. Therefore, the actions of the delivery vehicle can be carried out via the cloud-based computing device associated with the delivery vehicle as opposed to the delivery vehicle itself. The cloud platform can control and manage the communications and operations between the delivery vehicle and the target vehicle. The target vehicle can also be in communication with the cloud platform. The delivery vehicle and the target vehicle can also directly communicate with each other with the cloud platform being able to detect and record such communications. The method 400 can be executed using computing devices, such as the systems, modules, and devices described with respect to FIGS. 1-3.

The method 400 can be performed, for example, by executing a machine-readable program or other computer-executable instructions, such as instructions or programs described according to JavaScript, C, or other such instructions. The steps, or operations, of the method 400 or any other technique, method, process, or algorithm described in connection with the implementations disclosed herein can be implemented directly in hardware, firmware, software executed by hardware, circuitry, or a combination thereof.

The method 400 includes the target vehicle detecting and uploading data (including sensor data) to the cloud platform at regular intervals or when requested via operation 402. For example, the target vehicle can continuously detect the data from various sensors of the vehicle, can detect the data at predetermined or regular intervals (e.g., once a month, time periods set by the vehicle owner, after each 5000 miles driven, etc.), or can detect the data once a request to start monitoring is submitted by the vehicle owner/user. The cloud platform receives the data from the target vehicle, stores the data in a database and makes it available to authorized third-party service providers via operation 404. The authorization can include an authentication process that requires the service providers to submit an application that can be added (if approval or authentication is achieved) to a database of service providers stored within the cloud platform. For example, various service providers can apply for authorization by presenting various bids or the vehicle owner/user can select from a list of potential service providers based on various reviews and ratings.

Once authorized, the third-party service providers associated with the delivery vehicles (e.g., via the cloud-based computing app) can request the target vehicle's data (and data associated with a plurality of other vehicles) that is being stored in the cloud platform at regular intervals to identify potential service needs via operation 406. The service providers can request the target vehicle's data via the cloud-based computing app or the delivery vehicle (and associated cloud-based computing app) can automatically receive the target vehicle's data. For example, based on the data received that indicates a low fuel level, the service provider can identify that the target vehicle has a refueling service need. The identified service needs are transmitted via a notification or message to the vehicle owner or user associated with the target vehicle via operation 408. For example, the transmissions can be automatic once a service need is identified or only certain types of service needs can be automatically sent (e.g., urgent or required services including but not limited to a flat tire). The vehicle owner authorizes the service based on the received message via operation 410. For example, the vehicle owner can select a setting that automatically authorizes all services that are at a certain importance level or the vehicle owner can require manual authorization for each identified service need.

Figure 5:
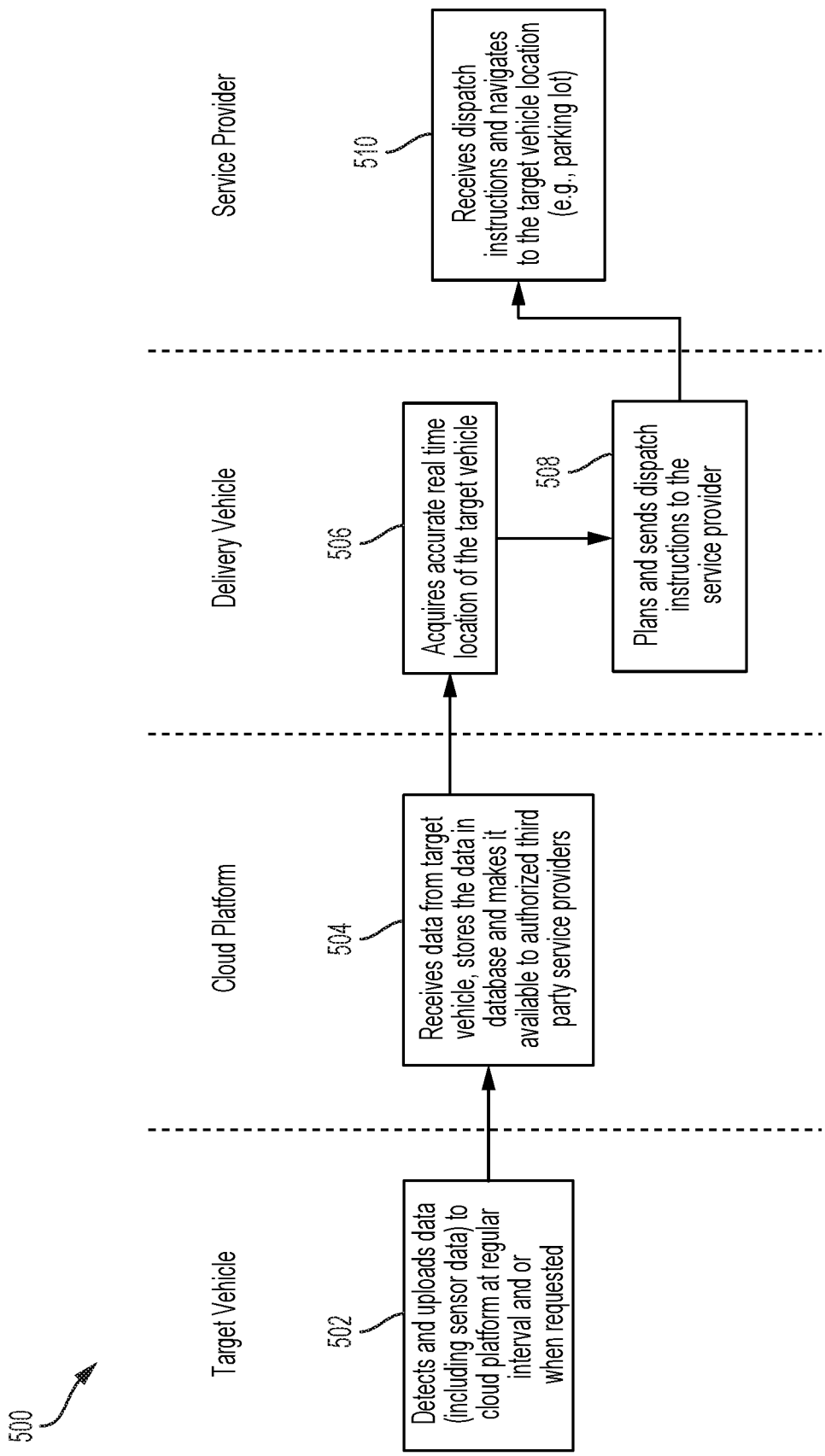
FIG. 5 illustrates a flowchart of an example of a method for determining target vehicle locations and dispatching service providers in accordance with implementations of this disclosure.

FIG. 5 illustrates a flowchart of an example of a method 500 for determining target vehicle locations and dispatching service providers in accordance with implementations of this disclosure. The method 500 is performed within an environment that includes a delivery vehicle (e.g., the delivery vehicle 102 of FIG. 1) that is associated with a service provider, a cloud platform (e.g., the cloud platform 100 of FIG. 1), and a target vehicle (e.g., the target vehicle 104 of FIG. 1) that is associated with a vehicle owner/user. The delivery vehicle can be controlled by the service provider (i.e., delivery agent) via a cloud-based computing device (e.g., a smartphone with an app, a built-in tablet with dashboard, etc.) that is in communication with the cloud platform. Therefore, the actions of the delivery vehicle can be carried out via the cloud-based computing device associated with the delivery vehicle as opposed to the delivery vehicle itself. The cloud platform can control and manage the communications and operations between the delivery vehicle and the target vehicle. The target vehicle can also be in communication with the cloud platform. The delivery vehicle and the target vehicle can also directly communicate with each other with the cloud platform being able to detect and record such communications.

The method 500 can be executed using computing devices, such as the systems, modules, and devices described with respect to FIGS. 1-3. The method 500 can be performed, for example, by executing a machine-readable program or other computer-executable instructions, such as instructions or programs described according to JavaScript, C, or other such instructions. The steps, or operations, of the method 500 or any other technique, method, process, or algorithm described in connection with the implementations disclosed herein can be implemented directly in hardware, firmware, software executed by hardware, circuitry, or a combination thereof.

The method 500 includes the target vehicle detecting and uploading data (including sensor data) to the cloud platform at regular intervals or when requested via operation 502 (similar to the operation 402 of FIG. 4). For example, the target vehicle can continuously detect the data from various sensors of the vehicle, can detect the data at predetermined or regular intervals (e.g., once a month, time periods set by the vehicle owner, after each 5000 miles driven, etc.), or can detect the data once a request to start monitoring is submitted by the vehicle owner/user. The cloud platform receives the data from the target vehicle, stores the data in a database and makes it available to authorized third party service providers via operation 504 (similar to the operation 404 of FIG. 4). For example, various service providers can apply for authorization by presenting various bids or the vehicle owner/user can select from a list of potential service providers based on various reviews and ratings.

Once authorized, the delivery vehicles (e.g., via the cloud-based computing app) can acquire accurate real-time location data of the target vehicle via operation 506. Based on the received location data, the delivery vehicles (e.g., via the cloud-based computing app) can plan and send dispatch instructions and information to a service provider associated with the delivery vehicle (i.e., the driver of the delivery vehicle) via operation 508. After receiving the dispatch instructions from the delivery vehicle or the cloud-based computing app associated with the delivery vehicle, the service provider can navigate to the target vehicle's location (e.g., a parking lot) via operation 510. The dispatch instructions can be shared with the cloud platform and can also include a designated time for the service. Based on the dispatch instructions associated with a plurality of vehicles, an optimized route based on location and designated service times can be produced by the cloud platform (or the cloud-based computing app associated with the delivery vehicle). For example, an optimized route can coordinate the servicing of vehicles that are nearby and can also avoid various traffic conditions.

Figure 6:
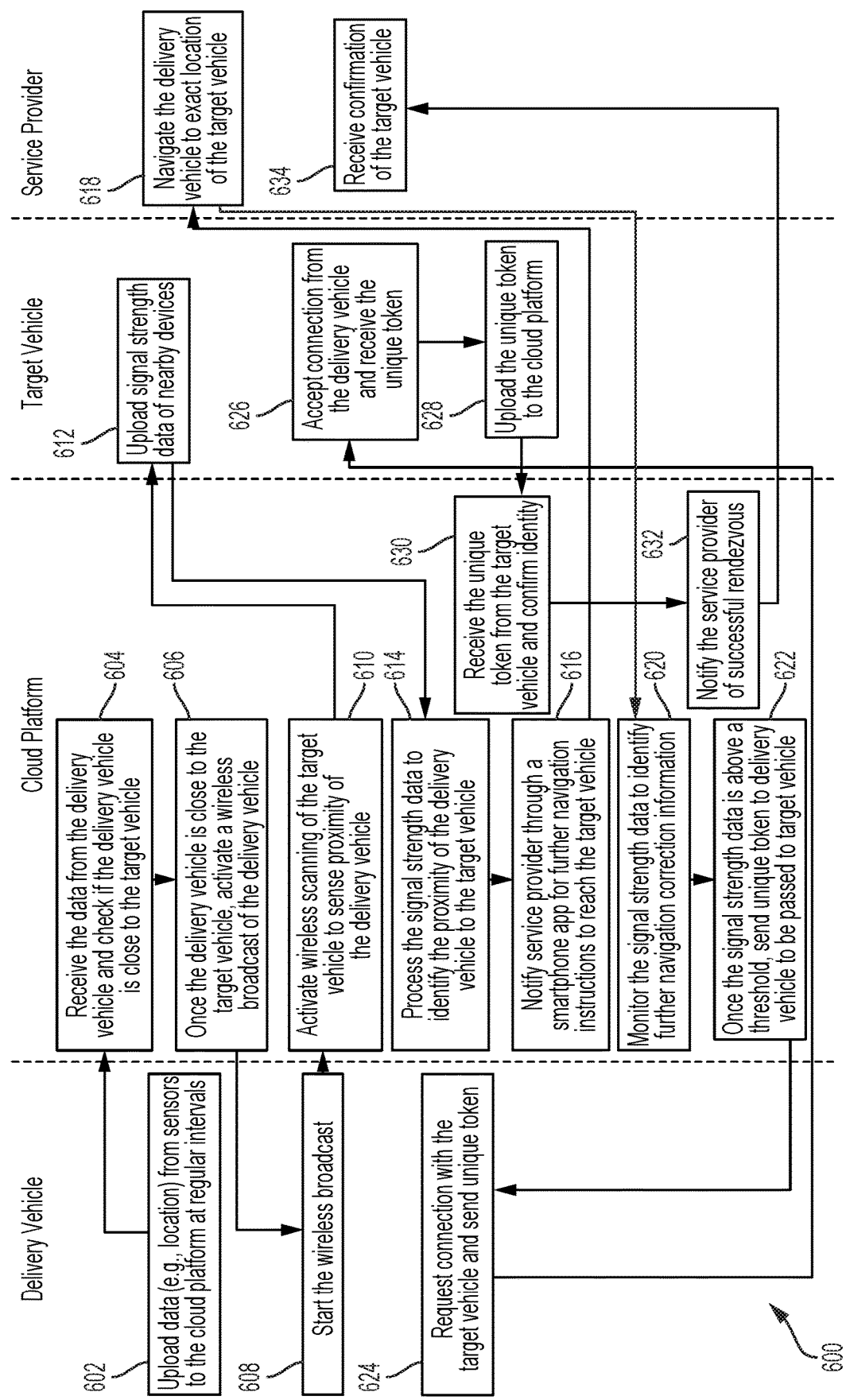
FIG. 6 illustrates a flowchart of an example of a method for connecting delivery vehicles to target vehicles in accordance with implementations of this disclosure.

FIG. 6 illustrates a flowchart of an example of a method 600 for connecting delivery vehicles to target vehicles in accordance with implementations of this disclosure. The method 600 is performed within an environment that includes a delivery vehicle (e.g., the delivery vehicle 102 of FIG. 1) that is associated with a service provider, a cloud platform (e.g., the cloud platform 100 of FIG. 1), and a target vehicle (e.g., the target vehicle 104 of FIG. 1) that is associated with a vehicle owner/user. The delivery vehicle can be controlled by the service provider (i.e., delivery agent) via a cloud-based computing device (e.g., a smartphone with an app, a built-in tablet with dashboard, etc.) that is in communication with the cloud platform. Therefore, the actions of the delivery vehicle can be carried out via the cloud-based computing device associated with the delivery vehicle as opposed to the delivery vehicle itself. The cloud platform can control and manage the communications and operations between the delivery vehicle and the target vehicle. The target vehicle can also be in communication with the cloud platform. The delivery vehicle and the target vehicle can also directly communicate with each other with the cloud platform being able to detect and record such communications. The method 600 can be executed using computing devices, such as the systems, modules, and devices described with respect to FIGS. 1-3.

The method 600 can be performed, for example, by executing a machine-readable program or other computer-executable instructions, such as instructions or programs described according to JavaScript, C, or other such instructions. The steps, or operations, of the method 600 or any other technique, method, process, or algorithm described in connection with the implementations disclosed herein can be implemented directly in hardware, firmware, software executed by hardware, circuitry, or a combination thereof.

The method 600 includes the delivery vehicle uploading data (e.g., location information) from its vehicle sensors to the cloud platform at regular intervals via operation 602. The cloud platform receives the data from the delivery vehicle and determines whether (checks) if the delivery vehicle is close (e.g., within a predetermined distance) to the target vehicle via operation 604. Once the delivery vehicle is determined to be close to the target vehicle, the cloud platform actives a wireless broadcast (e.g., transmitting Bluetooth, WiFi, DSRC signals) of the delivery vehicle via operation 606 and the delivery vehicle starts the wireless broadcast via operation 608. The cloud platform activates wireless scanning of the target vehicle to sense proximity of the delivery vehicle using the wireless broadcast via operation 610. The target vehicle uploads signal strength data of nearby devices based on the wireless scanning via operation 612. The cloud platform processes the signal strength data to identify the proximity of the delivery vehicle to the target vehicle via operation 614. The cloud platform notifies the service provider through a smartphone app (or another cloud-based computing device) with further navigation instructions to reach the target vehicle via operation 616.

The service provider navigates the delivery vehicle to a more precise or exact location of the target vehicle based on the receiving further navigation instructions via operation 618. The cloud platform monitors the signal strength data to identify further navigation correction information via operation 620. Once the signal strength data is above a predetermined threshold, the cloud platform sends a unique token (e.g., encrypted password) to the delivery vehicle to be passed to the target vehicle to secure a connection via operation 622. In some implementations, the cloud platform can instruct the target vehicle to make an action (e.g., flash lights, turn signal lights on, honk horn, etc.) to enable the service provider to confirm the identity of the target vehicle. The delivery vehicle requests a connection with the target vehicle and sends the unique token via operation 624. The target vehicle accepts the connection and receives the unique token from the delivery vehicle via operation 626 and uploads the unique token to the cloud platform via operation 628. The cloud platform receives the unique token from the target vehicle and confirms identity of the target vehicle via operation 630. The cloud platform notifies the service provider of a successful rendezvous via operation 632 resulting in the service provider receiving a confirmation notification (e.g., an alert) of the target vehicle via operation 634.

Figure 7:
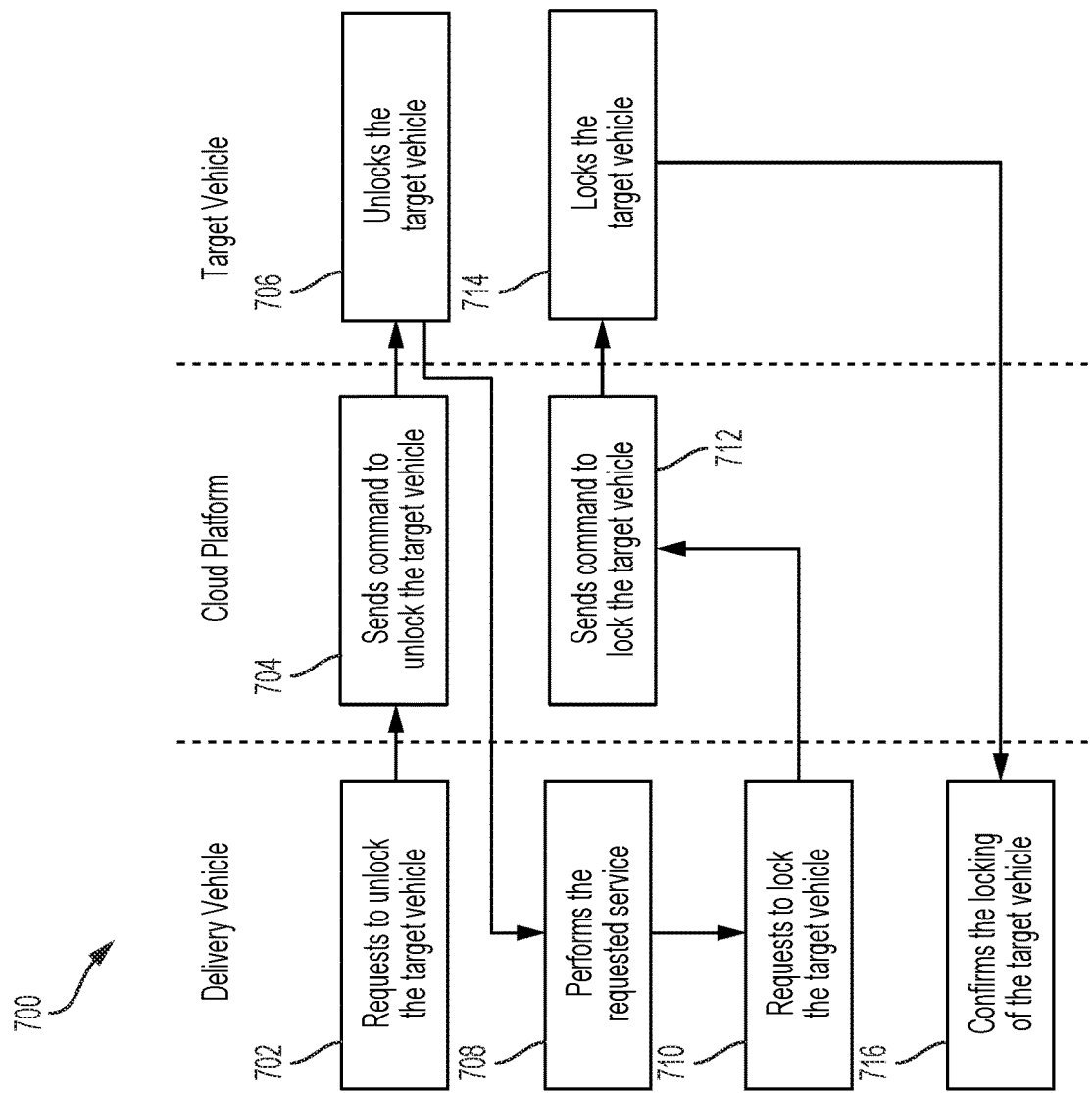
FIG. 7 illustrates a flowchart of an example of a method for providing access control of target vehicles in accordance with implementations of this disclosure.

FIG. 7 illustrates a flowchart of an example of a method 700 for providing access control of target vehicles in accordance with implementations of this disclosure. The method 700 is performed within an environment that includes a delivery vehicle (e.g., the delivery vehicle 102 of FIG. 1) that is associated with a service provider, a cloud platform (e.g., the cloud platform 100 of FIG. 1), and a target vehicle (e.g., the target vehicle 104 of FIG. 1) that is associated with a vehicle owner/user. The delivery vehicle can be controlled by a service provider (i.e., delivery agent) via a cloud-based computing device (e.g., a smartphone with an app, a built-in tablet with dashboard, etc.) that is in communication with the cloud platform. Therefore, the actions of the delivery vehicle can be carried out via the cloud-based computing device associated with the delivery vehicle as opposed to the delivery vehicle itself. The cloud platform can control and manage the communications and operations between the delivery vehicle and the target vehicle. The target vehicle can also be in communication with the cloud platform. The delivery vehicle and the target vehicle can also directly communicate with each other with the cloud platform being able to detect and record such communications.

The method 700 can be executed using computing devices, such as the systems, modules, and devices described with respect to FIGS. 1-3. The method 700 can be performed, for example, by executing a machine-readable program or other computer-executable instructions, such as instructions or programs described according to JavaScript, C, or other such instructions. The steps, or operations, of the method 700 or any other technique, method, process, or algorithm described in connection with the implementations disclosed herein can be implemented directly in hardware, firmware, software executed by hardware, circuitry, or a combination thereof.

The method 700 includes the service provider associated with the delivery vehicle requesting to unlock the target vehicle that is being serviced via operation 702. For example, the service provider can use the cloud-based computing device to submit the unlocking request or the unlocking request can be automatically generated once the delivery vehicle comes within a predetermined distance of the target vehicle after identification of the target vehicle has been confirmed. The access request is transmitted to the cloud platform which sends a command or instruction to unlock the target vehicle via operation 704. Once the unlocking command is received by the target vehicle, the target vehicle unlocks itself via operation 706. The unlocking command can also be received by a user of the target vehicle that can authorize the request remotely (e.g., via a smartphone application that is in communication with the target vehicle and the cloud platform).

After the target vehicle is unlocked and the access is provided to the service provider, the service provider performs the requested service via operation 708 and sends a request to lock the target vehicle that has just been serviced via operation 710. For example, the service provider can use the cloud-based computing device to submit the locking request or the locking request can be automatically generated once the delivery vehicle is beyond a predetermined distance of the target vehicle. The locking request is transmitted to the cloud platform which sends a command to lock the target vehicle via operation 712. Once the locking command is received by the target vehicle, the target vehicle locks itself via operation 714. The locking command can also be received by a user of the target vehicle or third-party that can authorize the request remotely (e.g., via a smartphone application that is in communication with the target vehicle and the cloud platform). The service provider associated with the delivery vehicle confirms the locking of the target vehicle via operation 716. For example, the confirmation can be in the form of transmitting a notification message to a user of the target vehicle.

Figure 8:
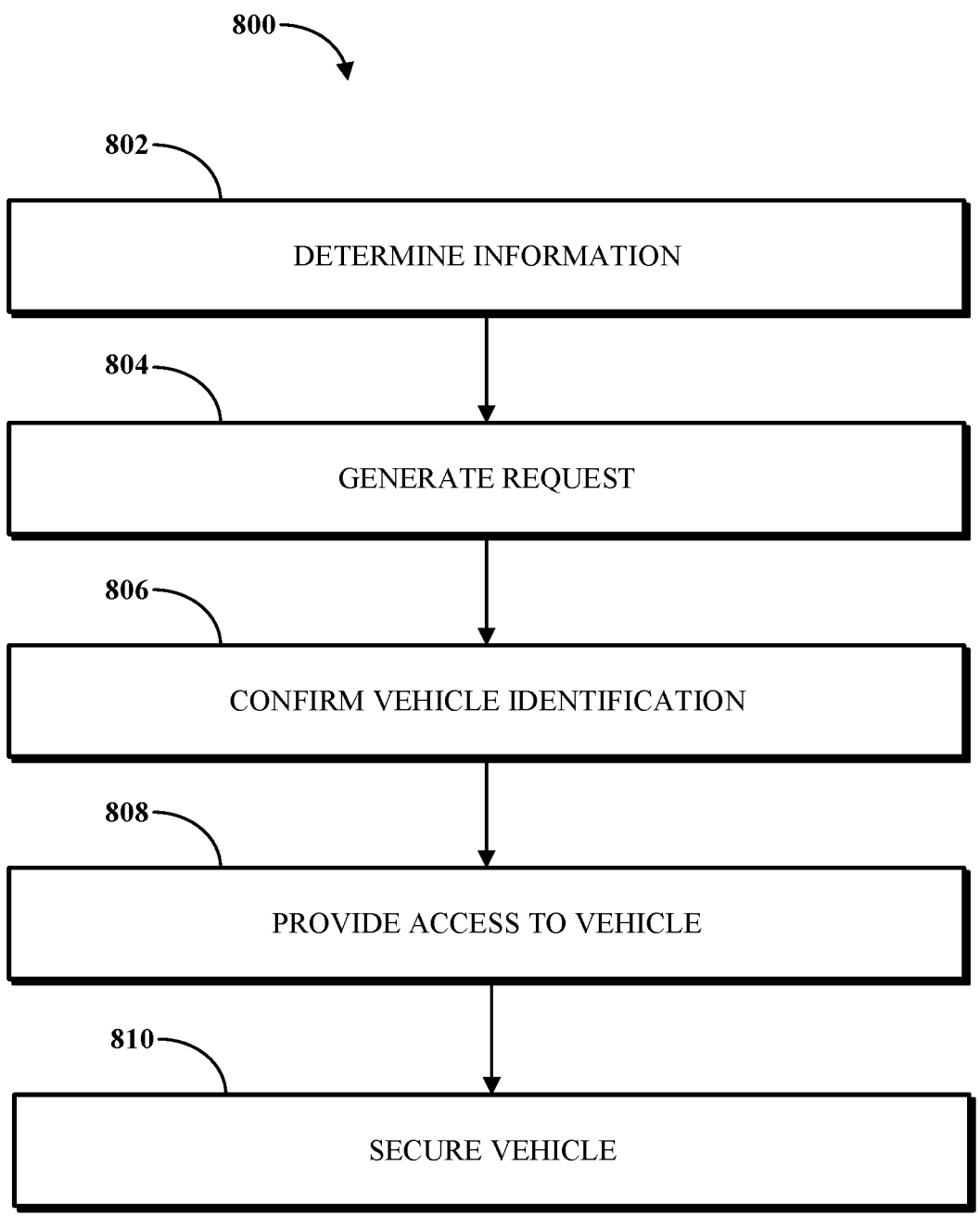
FIG. 8 illustrates a flowchart of an example of a method for providing an on-demand service to a vehicle in accordance with implementations of this disclosure.

FIG. 8 illustrates a flowchart of an example of a method 800 for providing an on-demand service to a vehicle in accordance with implementations of this disclosure. The method 800 can be executed using computing devices, such as the systems, modules, and devices described with respect to FIGS. 1-3 (e.g., the cloud platform 100 of FIG. 1). The method 800 can be performed, for example, by executing a machine-readable program or other computer-executable instructions, such as instructions or programs described according to JavaScript, C, or other such instructions. The steps, or operations, of the method 800 or any other technique, method, process, or algorithm described in connection with the implementations disclosed herein can be implemented directly in hardware, firmware, software executed by hardware, circuitry, or a combination thereof.

The method 800 includes determining information associated with a vehicle via operation 802, generating a request associated with the vehicle via operation 804, confirming identification of the vehicle via operation 806, providing access to the vehicle via operation 808, and securing the vehicle via operation 810. The information that is determined via the operation 802 can be information about a vehicle or a plurality of vehicles including but not limited to model type and year, location, services needed/requested. The request that is generated via the operation 804 can include a variety of on-demand vehicle convenience service requests including but not limited to refueling the vehicle, washing the vehicle, providing maintenance to the vehicle, and delivering a package to a customer of the vehicle (e.g., delivering a package to the customer using a trunk of the vehicle). The identification of the vehicle can be confirmed via the operation 806 using a plurality of wireless signals including but not limited to GPS, WiFi, Bluetooth, and NFC signals or a plurality of communication mechanisms including but not limited to text communications. The access to the vehicle can be provided via the operation 808 to a service provider (e.g., the refueling company that receives the generated request) by remotely unlocking the vehicle or via another similar mechanism. The vehicle can be secured via the operation 810 after the service provider has performed the requested on-demand service and information associated with the completion of the performance is received.

Figure 9:
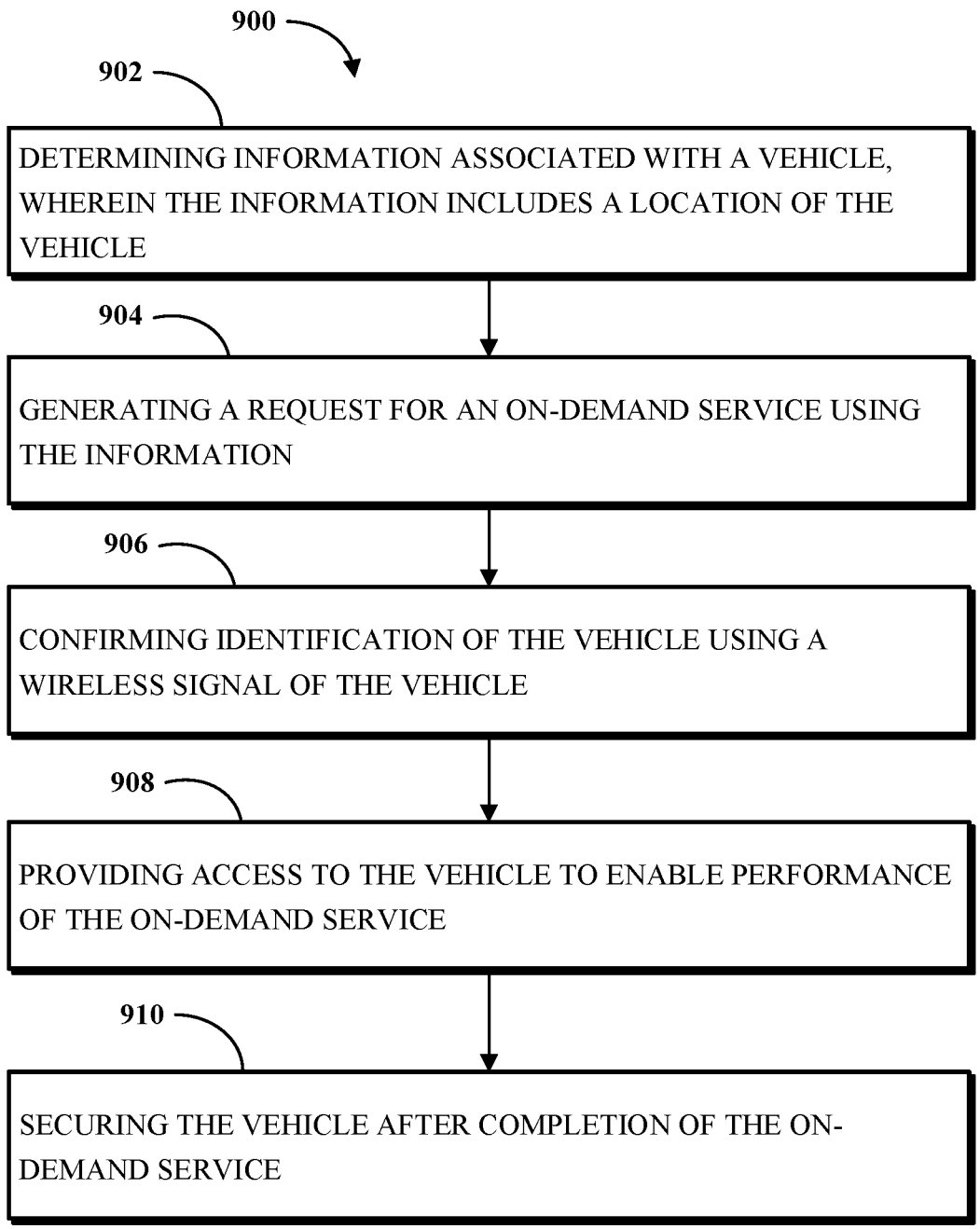
FIG. 9 illustrates a flowchart of an example of a method for providing an on-demand service to a vehicle in accordance with implementations of this disclosure.

FIG. 9 illustrates a flowchart of an example of a method 900 for providing an on-demand service to a vehicle in accordance with implementations of this disclosure. The method 900 can be executed using computing devices, such as the systems, modules, and devices described with respect to FIGS. 1-3 (e.g., the cloud platform 100 of FIG. 1). The method 900 can be performed, for example, by executing a machine-readable program or other computer-executable instructions, such as instructions or programs described according to JavaScript, C, or other such instructions. The steps, or operations, of the method 900 or any other technique, method, process, or algorithm described in connection with the implementations disclosed herein can be implemented directly in hardware, firmware, software executed by hardware, circuitry, or a combination thereof.

The method 900 includes determining information associated with the vehicle, wherein the information includes a location of the vehicle via operation 902; generating a request for the on-demand service using the information via operation 904; confirming identification of the vehicle using a wireless signal of the vehicle via operation 906; providing access to the vehicle to enable performance of the on-demand service via operation 908; and securing the vehicle after completion of the on-demand service via operation 910. In some implementations, the on-demand service can include any of fuel delivery, package delivery, car cleaning, and car maintenance. The information can further include any of a tire pressure, a fuel level, an odometer reading, a check engine notification, a service reminder notification, a cleanliness rating, and service history information of the vehicle.

The determination of the information associated with the vehicle via the operation 902 can comprise receiving data from the vehicle via a telematic control unit (TCU) and determining the information using the data. The data can be continuously detected by the TCU using a plurality of sensors of the vehicle (or external sensors near the vehicle). The confirmation of the identification of the vehicle using the wireless signal via the operation 906 can comprise determining an updated location of the vehicle using a strength of the wireless signal; communicating the updated location to a service provider performing the on-demand service; and in response to detecting that the service provider is within a predetermined distance of the vehicle, instructing the vehicle to transmit a message to the service provider. In some implementations, the message can include any of flashing lights, horn signals, turn signals, token exchanges, text communications, and graphical images.

The access provided to the vehicle via the operation 908 and the securing of the vehicle via the operation 910 can be enabled using controller area network (CAN) bus connectivity. Providing the access to the vehicle via the operation 908 can comprise providing access to a trunk of the vehicle by remotely unlocking the trunk, wherein the trunk is remotely secured after completion of the package delivery via the operation 910. In some implementations, the method 900 can include transmitting a notification after completion of the on-demand service to any of a user of the vehicle, a service provider performing the on-demand service, and a third-party monitoring performance of the on-demand service.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed:

1. A method, comprising:
   receiving information associated with a vehicle;
   receiving a request for the information from one or more authorized fuel delivery on-demand service providers;
   transmitting the information to the one or more authorized fuel delivery on-demand service providers;
   responsive to acceptance by the vehicle of a request to provide a fuel delivery on-demand service received from a service provider of the one or more authorized fuel delivery on-demand service providers, receiving location data of a delivery vehicle of the service provider;
   determining that the delivery vehicle is within a predefined distance of the vehicle;
   activating wireless scanning of the vehicle to determine signal strength data associated with the delivery vehicle;
   determining that the signal strength data meets a predefined threshold;
   instructing the vehicle to transmit a message to the service provider to confirm identification of the vehicle;
   providing access to the vehicle to enable performance of the fuel delivery on-demand service; and
   securing the vehicle after completion of the fuel delivery on-demand service.

2. The method of claim 1, further comprising:
   transmitting a notification after completion of the fuel delivery on-demand service to at least one of an operator of the vehicle, a service provider performing the fuel delivery on-demand service, or a third-party monitoring performance of the fuel delivery on-demand service.

3. The method of claim 1, further comprising:
   receiving data from a telematic control unit of the vehicle; and
   determining the information associated with the vehicle using the data, the information including a location of the vehicle and a fuel level of the vehicle.

4. The method of claim 3, wherein receiving the data from the telematic control unit of the vehicle comprises:
   receiving the data from the telematic control unit that is in communication with a fuel level sensor of the vehicle through a controller area network (CAN) bus, the fuel level sensor being configured to detect the fuel level of the vehicle.

5. The method of claim 4, wherein the data is continuously detected by the telematic control unit that is in communication with a plurality of sensors of a plurality of sub-systems of the vehicle, the plurality of sensors including the fuel level sensor.

6. The method of claim 4, wherein access is provided to the vehicle and the vehicle is secured using the CAN bus.

7. The method of claim 1, wherein the message includes at least one of flashing lights, horn signals, turn signals, token exchanges, text communications, or graphical images.

8. The method of claim 1, wherein providing access to the vehicle to enable performance of the fuel delivery on-demand service comprises:
   providing access to a gas tank of the vehicle by remotely unlocking the gas tank to enable performance of the fuel delivery on-demand service.

9. The method of claim 1, wherein securing the vehicle after completion of the fuel delivery on-demand service comprises:
   securing the gas tank remotely after completion of the fuel delivery on-demand service.

10. A system, comprising:
    a processor; and
    a memory including instructions executed by the processor to:
      receive information associated with a vehicle;
      receive a request for the information from one or more authorized fuel delivery on-demand service providers;
      transmit the information to the one or more authorized fuel delivery on-demand service providers;
      responsive to acceptance by the vehicle of a request to provide a fuel delivery on-demand service received from a service provider of the one or more authorized fuel delivery on-demand service providers, receive location data of a delivery vehicle of the service provider;
      determine that the delivery vehicle is within a predefined distance of the vehicle;
      activate wireless scanning of the vehicle to determine signal strength data associated with the delivery vehicle;
      determine that the signal strength data meets a predefined threshold;
      instruct the vehicle to transmit a message to the delivery vehicle to confirm identification of the vehicle;
      provide access to the vehicle to enable performance of the fuel delivery on-demand service; and
      secure the vehicle after completion of the fuel delivery on-demand service.

11. The system of claim 10, further including instructions executed by the processor to:
    transmit a notification after completion of the fuel delivery on-demand service to at least one of a user of the vehicle, a service provider performing the fuel delivery on-demand service, or a third-party monitoring performance of the fuel delivery on-demand service.

12. The system of claim 10, further including instructions executed by the processor to:
    receive data from a telematic control unit of the vehicle; and
    determine the information associated with the vehicle using the data, the information including a location of the vehicle and a fuel level of the vehicle.

13. The system of claim 12, wherein to receive the data from the telematic control unit of the vehicle comprises to:
receive the data from the telematic control unit that is in communication with a fuel level sensor of the vehicle through a controller area network (CAN) bus, the fuel level sensor being configured to detect the fuel level of the vehicle.

14. The system of claim 13, wherein the data is continuously detected by the telematic control unit that is in communication with a plurality of sensors of a plurality of sub-systems of the vehicle, the plurality of sensors including the fuel level sensor.

15. The system of claim 13, wherein access is provided to the vehicle and the vehicle is secured using the CAN bus.

16. The system of claim 10, wherein the message includes at least one of flashing lights, horn signals, turn signals, token exchanges, text communications, or graphical images.

17. The system of claim 10, wherein to provide access to the vehicle to enable performance of the fuel delivery on-demand service comprises to:
provide access to a gas tank of the vehicle by remotely unlocking the gas tank to enable performance of the fuel delivery on-demand service.

18. The system of claim 10, wherein to secure the vehicle after completion of the fuel delivery on-demand service comprises to:
secure the gas tank remotely after completion of the fuel delivery on-demand service.

\* \* \* \* \*